United States Patent [19]

Nahm

[11] Patent Number: 5,254,603
[45] Date of Patent: Oct. 19, 1993

[54] LOW TOXICITY RADIATION CURABLE RESINS AND COATINGS MADE THEREFROM

[75] Inventor: Steven H. Nahm, Greensburg, Pa.

[73] Assignee: Hercules Incorporated, Wilmington, Del.

[21] Appl. No.: 633,735

[22] Filed: Dec. 24, 1990

[51] Int. Cl.$^5$ .............................................. C08K 5/16
[52] U.S. Cl. ...................... 522/72; 522/42; 522/107
[58] Field of Search ....................... 522/72, 107, 42

[56] References Cited

U.S. PATENT DOCUMENTS

| | | | |
|---|---|---|---|
| 3,878,139 | 4/1975 | Takahashi et al. | 250/17 A |
| 4,071,578 | 1/1978 | Lasher | 260/850 |
| 4,168,173 | 9/1979 | Pohl | 522/107 |
| 4,271,259 | 6/1981 | Breslow et al. | 522/107 |
| 4,654,379 | 3/1987 | Lapin | 522/72 |
| 4,861,629 | 8/1989 | Nahm | 522/89 |

FOREIGN PATENT DOCUMENTS 2159524 12/1985 United Kingdom.

OTHER PUBLICATIONS

Puchkova, V. V., et al., "Use of Vinyl Esters in Radiation-Cured Coating Compositions", *Lakokras. Mater.*, No. 4, 17 (1980).

Knapczyk, Jerome W., "Polyally Glycidyl Ether Resins for Very Fast Curing High Performance Coatings", *J. of Coating Technology*, vol. 60 No. 756 pp. 63–72 (Jan. 1988).

*Primary Examiner*—Marion E. McCamish
*Assistant Examiner*—Mark A. Chapman
*Attorney, Agent, or Firm*—Roslyn T. Tobe; James K. Luchs

[57] ABSTRACT

A radiation curable coating composition comprising reactive monomers, a photoinitiator, between about 4 wt.% to 35 wt.% of a cellulose derivative, preferably nitrocellulose and an unsaturated polyester resin which is the reaction product of glycols and unsaturated dibasic acids. Coatings prepared in accordance with the present invention can be used as overprint varnishes for magazines and other coated papers. These coatings may also be used to provide a protective finish for wood.

10 Claims, No Drawings

LOW TOXICITY RADIATION CURABLE RESINS AND COATINGS MADE THEREFROM

BACKGROUND OF THE INVENTION

1. Field of the Invention

The present invention relates to radiation curable coating compositions comprising unsaturated polyester resins containing at least two unsaturated groups, a reactive monomer or mixture of monomers, photoinitiator, and between about 4 wt. % to about 35 wt. % of an organosoluble, film forming, cellulose derivative.

2. Description of the Related Art

Solutions of unsaturated polyester resins in styrene or vinyl toluene are commonly used in radiation curing. These resins are particularly prone to oxygen inhibition of cure because of their slower rate of polymerization. In appli-cations where rapid and thorough surface cure is required, the surface must be physically protected from oxygen. Methods of oxygen protection include the use of a photo initiator which scavenges dissolved oxygen during irradiation and blanketing the coated substrate with an inert gas such as nitrogen. The present invention replaces the toxic styrene monomer of typical unsaturated polyester resin systems with reactive monomers which reduce the oxygen inhibition of these systems by increasing the cure or copolymerization rate.

It is known that under some circumstances, alternating copolymers may form faster than homopolymers. This is especially true if the electronic characteristics of the monomers are complimentary such that one is electron rich, and the other is electron poor. Under these conditions there is a polar character to the radical intermediates which propagate the growing chains. There is a stronger driving force for them to react with the monomer of opposite polar character than with their own monomer. The reactive monomers utilized by the present invention have a complimentary electron rich character compared to the maleate and fumarate functionality present in the unsaturated polyester resin.

A British patent application, GB 2,159,524 dated Dec. 14, 1985, describes the thermal solution copolymerization of cellulose graft copolymers containing maleic side groups with monofunctional vinyl monomers to form soluble cellulose ester graft copolymers for use as thermoplastic resins in thermoset coating compositions. Also disclosed is the use of these cellulose graft maleic copolymers in thermoset coatings with hydroxyl group crosslinking agents such as amino resins and polyisocyanates. The patent application does not disclose the use of vinyl reactive monomers in conjunction with cellulose derivatives, photoinitiator, and unsaturated polyester resin to produce radiation cured coatings.

The present invention seeks to overcome many of the limitations found in the radiation curable systems currently in use. The objectives of the present invention are reduced toxicity, reduced oxygen inhibition to radiation-induced cure, fast cure speed, and low cure temperatures.

DESCRIPTION OF THE INVENTION

The present invention relates to radiation curable coating compositions comprising:

(1) between about 10 wt. % to 50 wt. % based on total weight of the composition of an unsaturated polyester resin having at least 2 ethylenic groups of the structure

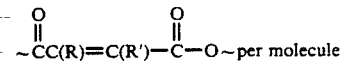

where R and R' are the same or different and are selected from the group consisting of hydrogen, an alkyl having 1 to 22 carbon atoms and aryl.

(2) between about 7 wt. % to 84 wt. % based on total weight of the composition of reactive monomers having the formula

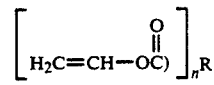

where R is a $C_1$ to $C_{12}$ alkyl or aryl and $n=1$ or 2

(3) between about 1 wt. % to 10 wt. % based on total weight of the composition of a photoinitiator; and (4) between about 4 wt. % to 35 wt. % based on total weight of the composition of an organosoluble, film forming, cellulose derivative. Preferably, the radiation curable coating composition comprises:

(1) about 35 wt. % to 45 wt. % of the unsaturated polyester resin;

(2) about 24 wt. % to 48 wt. % of the reactive monomers;

(3) about 2 wt. % to 6 wt. % of the photoinitiator; and (4) about 15 wt. % to 25 wt. % of the organosoluble, film forming, cellulose derivative.

Most preferably the radiation curable coating composition comprises:

(1) about 40 wt. % of the unsaturated polyester resin;

(2) about 36 wt. % of the reactive monomers;

(3) about 4 wt. % of the photoinitiator; and (4) about 20 wt. % of the organosoluble, film forming, cellulose derivative.

The unsaturated polyester resin is prepared by any of the conventional methods to condense glycols with unsaturated dibasic acids or their derivatives. Preferred glycols used to prepare the polyester resin are 1,n-alkyl diols, 1,2 alkylene glycol oligomers, and mixtures thereof. Exemplary glycols used to prepare polyester resins are tripropylene glycol, butane-1,4-diol, trimethylolethane, and caprolactone triol. Preferred unsaturated dibasic acids are maleic acid, maleic acid derivatives, fumaric acid, fumaric acid derivatives, and mixtures thereof. Exemplary unsaturated polyester resins formed by reacting the unsaturated dibasic acid and the glycol are polyalkylene maleates and polyalkylene fumarates having at least two ethylenically unsaturated groups. A preferred unsaturated polyester resin is a polyethylene maleate of low molecular weight and viscosity with about 5-10 degrees of polymerization. Molecular weights can be easily controlled by inclusion of monobasic carboxylic acids (R—$CO_2H$) or monofunctional alcohols (R—OH), where R contains between 1 and 22 carbon atoms. The structure of R can substantially effect the solubility and viscosity of the Polyester resins. Alkyl groups containing 11 or more aliphatic carbon atoms can substantially affect the surface wetting characteristics of the polyester resins. R groups may also contain unsaturation, which can substantially improve the cure speed of the coating.

The reactive monomer serves to cross link the polyester resin. Exemplary reactive monomers are linear or cyclic alkyl vinyl ethers, linear or cyclic divinyl ethers, vinyl esters, divinyl esters, vinyl carbonates, divinyl carbonates, vinyl carbamates, cyclic and open chain ketene acetals and esters, vinyl aromatics and mixtures thereof. Preferably the reactive monomers are selected from the group consisting of vinyl acetate, divinyl adipate, divinyl phthalate, divinyl isophthalate, and mixtures thereof. Most preferably the reactive monomer is divinyl adipate. A preferred reactive monomer mixture contains at least 30 wt. % of divinyl adipate.

The compositions of this invention can be cured by ultraviolet (UV) irradiation at ambient temperature in the Presence of oxygen and in the presence of photosensitive materials which initiate polymerization upon irradiation. Suitable photoinitiators well known in the art include both the diaromatic ketone abstraction type initiators and the mixed arylaalkyl ketone fragmentation types. Exemplary diaromatic ketone abstraction type initiators include benzophenone derivatives, thioxanthone derivatives, mixtures of benzopbenone derivatives with hydrogen donor synergists such as tertiary amines and thiols, and mixtures of thioxanthone derivatives with hydrogen donor synergists such as tertiary amines and thiols. Exemplary mixed arylalkyl ketone fragmentation type initiators include acetophenone derivatives containing at least one heteroatom beta to the carbonyl group. Preferred photoinitiators used in the present invention are solid benzoyl cyclohexanol available commercially under the tradename Irgacure 184 (Irg 184) from Ciba-Geigy and liquid benzoyl isopropanol available under the tradename Darocure 1173 (Dar 1173) from E. M. Industries.

Alternatively, the compositions of this invention can be cured by electron beam irradiation in the presence of oxygen and in the absence of added photosensitive materials.

Exemplary cellulose derivatives include nitrocellulose, cellulose acetate propionate, cellulose acetate butyrate, methylcellulose, ethylcellulose, hydroxyalkyl cellulose, and hydrophobically modified cellulose ethers. Nitrocellulose and cellulose acetate butyrate are preferred cellulose derivatives.

Coatings prepared in accordance with the present invention can be used as overprint varnishes for magazines and other coated papers. These coatings may also be used to Provide a protective finish for wood. The following examples illustrate the practice of this invention.

EXAMPLES

General Procedures

Unless otherwise noted, all formulations were made up according to the equivalent weights of the reactive vinyl monomer and unsaturated polyester carbon-carbon double bonds, to provide stoichiometric mixtures of the resins.

All nitrocellulose (NC) used began as toluene wet. Alcohol-wet and plasticizer-wet NC may also be used. When other wetting agents were needed, the NC was first air dried overnight, then rewetted by tumbling overnight. All other chemicals and resins were used as received.

UV cure was either accomplished by irradiation with a modified Fusion Systems Model F440 Lamp System, using an unfocused "D" lamp approximately 10 inches above the substrate (1-4 joules/cm$^2$); or by an Argus 7125 UV Process with one (1) focused lamp operated at 200 watt/inch power at a belt speed of 100 ft/min. (0.17 Joules/cm$^2$). The photo-initiators used were solid benzoyl cyclohexanol available under the tradename Irgacure 184 (Irg 184) from Ciba-Geigy or liquid benzoyl isopropanol available under the tradename Darocure 1173 (Dar 1173) from E. M. Industries.

In the examples which follow, various coatings were prepared by mixing the specified percentages of the components together at ambient temperature to form a liquid coating. The coatings were applied to a paper substrate by draw-down and cured by exposure to about 2-4 joules/cm$^2$ amount of UV irradiation for 10-20 seconds in the presence of oxygen. The coatings were tested for their Konig hardness and percent unextractable. The Konig Hardness is expressed as a percent of glass. The Konig Hardness is a measure of hardness relative to glass. The value assigned to glass is 100. Typically, commercially useful films have a Konig Hardness of about 30% to 40% and commercially useful paper coatings have a Konig Hardness of about 18% to 25%. Percent unextractable is a measure of unreacted monomer related to the degree of cure of the coating. The higher the percent unextractable the greater the degree of cure of the coating. As used herein, ambient temperature means about 15° C. to 30° C. All amounts, unless designated otherwise, are expressed as weight percent based on total composition.

EXAMPLE 1

Coating mixtures comprising the amounts of a Polyester resin of tripropylene glycol bismethylmaleate (TrPGBM), a reactive monomer of vinyl acetate (VAc) or divinyl adipate (DVAd), nitrocellulose (NC) and a photoinitiator specified in Table 1 were prepared by mixing these components together under ambient conditions. The coating mixture was applied to a paper substrate. The paper substrate was exposed to about 2-4 joules/cm$^2$ of UV irradiation for about 10-20 seconds in the presence of oxygen at ambient temperatures. The coatings without NC did not cure as illustrated in Table 1.

TABLE 1

|  | 1A | 1B | 2A | 2B |
| --- | --- | --- | --- | --- |
| TrPGBM |  | 56.3 |  | 40.4 |
| VAc |  | 23.7 |  | — |
| DVAd |  | — |  | 39.6 |
| IRG 184 |  | 4.0 |  | 4.0 |
| NC (30-35 cps) | 20 | 0.0 | 20.0 | 0.0 |
| Konig Hardness | 2 | nc* | 19 | nc |
| % Unextractable | 62 | 0 | 85 | 0 |

*nc = no cure

EXAMPLE 2

A commercially available unsaturated polyester resin in xylene encompassed by the previous description of suitable unsaturated polyester resins is sold under the tradename Polylite 92-835 (92-835) by Reichhold Chemical and has many double bonds. When utilized in the coatings of the invention 92-835 shows an improved cur performance relative to TrPGBM which nominally has only two double bonds. This is illustrated in Table 2 where coatings containing only 92-835, only TrPGBM, or mixtures of the two polyester resins, show increasing cure performance with increasing amounts of 92-835.

These coatings were prepared and cured in a similar manner as those of Example 1.

TABLE 2

|  | −1 | −2 | −3 | −4 | −5 |
|---|---|---|---|---|---|
| NC (18-25 cps) | 19.4 | 19.4 | 19.4 | 19.4 | 19.4 |
| VAc | 29.0 | 29.0 | 29.0 | 29.0 | 29.0 |
| TrPGBM | 48.4 | 33.9 | 24.2 | 14.5 | — |
| 92-835 | — | 14.5 | 24.2 | 33.9 | 48.4 |
| Irg 184 | 4.0 | 4.0 | 4.0 | 4.0 | 4.0 |
| Konig Hardness (% glass) | — | 5 | 9 | 17 | 22 |
| % Unextractable | 0 | 30 | 45 | 54 | 65 |

EXAMPLE 3

The same trend of increased cure with a greater percentage of 92-835 than TrPGBM was observed even in the absence of NC, however; these films did not age well. After one week at ambient temperature the films were observed to be brittle and cracked easily. The initial cure results are tabulated in Table 3. These films were prepared as in Example 1.

TABLE 3

|  | 1 | 2 |
|---|---|---|
| 92-835 | 49.4 | 17.9 |
| TrPGBM | 24.9 | 54.1 |
| VAc | 25.8 | 28.0 |
| Irg 184 | 4.0 | 4.0 |
| Konig Hardness | 14 | 6 |
| % Unextractable | 81 | 60 |

EXAMPLE 4

It was expected that the optimum cure characteristics would occur at a weight ratio between reactive monomer and unsaturated polyester corresponding to a 1:1 molar ratio of the unsaturated groups in the polyester resin to those of the reactive monomer mixture. Unexpectedly, there was also little difference in the cured hardness or insolubles, measured as %. Unextractable, as the maleate/vinyl ester stoichiometry was changed at 14% NC. Based on the calculated equivalent weights for maleate and allyl carbon carbon double bonds (C═C) in the resin, stoichiometries which provided equal moles of vinyl ester and (allyl+maleate) C═Cs; equal moles of vinyl ester and maleate C═Cs; and two maleate C═Cs for each vinyl ester C═C were examined. The coatings were mixed in accordance with the percentages and compositions shown in Table 4, applied to a paper substrate and cured as in Example 1.

In compositions which contained either 4% or 14% NC, there was little difference in cured hardness or insolubles at a stoichiometric maleate/vinyl ester C═C ratio, as illustrated in Table 4.

TABLE 4

| NC | 4.0 | 14.4 | 14.0 | 14.4 |
|---|---|---|---|---|
| Allyl Terminated TrPG | 74.3 | 74.7 | 66.7 | 54.0 |
| DVAd | 21.7 | 10.9 | 19.3 | 31.6 |
| Dar 1173 | 4.0 | 4.0 | 4.0 | 4.0 |
| Konig Hardness | 31 | 28 | 28 | 29 |
| % Unextractable | 92 | 92 | 90 | 92 |

EXAMPLE 5

Coatings were prepared as in Example 1 using a commercially available unsaturated polyester resin in xylene, Polylite 92-835 (92-835), 10% NC, a photoinitiator and the following reactive monomers: vinyl benzoate (VBz), vinyl 4-tert butylbenzoate (VtBBz), and divinyl adipate (DVAd). As illustrated in Tables 5-7 there is little difference in the Konig Hardness or in the % unextractable between the various coatings. The coated paper substrate was cured as in Example 1.

TABLE 5

| Polylite 92-835 and Vinyl Benzoate (eq. wt = 148) | | |
|---|---|---|
| 1 | 2 | 3 |

| NC | 10% | 10% | 10 |
|---|---|---|---|
| 92-835 | 200 | 200 | 200 |
| VBz | 120 | 150 | 180 |
| Dar 1173 | 4% | 4% | 4% |
| Konig Hardness | 40 | 40 | 43 |
| % Unextractable | 81 | 80 | 80 |

TABLE 6

| Polylite 92-835 and Vinyl 4-tert-butylbenzoate (eq. wt = 204) | | |
|---|---|---|
| 1 | 2 | 3 |

| NC | 10% | 10% | 10% |
|---|---|---|---|
| 92-835 | 200 | 200 | 200 |
| VtBBz | 160 | 200 | 240 |
| Dar 1173 | 4% | 4% | 4% |
| Konig Hardness | 35 | 30 | 29 |
| % Unextractable | 77 | 77 | 76 |

TABLE 7

| Polylite 92-835 and Divinyl Adipate (eq. wt = 96) | | |
|---|---|---|
| 1 | 2 | 3 |

| NC | 10% | 10% | 10% |
|---|---|---|---|
| 92-835 | 200 | 200 | 200 |
| DVAd | 80 | 100 | 120 |
| Dar 1173 | 4% | 4% | 4% |
| Konig Hardness | 41 | 41 | 43 |
| % Unextractable | 90 | 81 | 88 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What I claim is:

1. A UV radiation curable coating composition comprising:
   (a) about 35 weight % to 45 weight % of an unsaturated polyester resin having at least two ethylenic group of the structure:

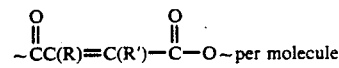

where R and R' are the same or different and are selected from the group of hydrogen, an alkyl having 1 to 22 carbon atoms and aryl;
   (b) about 24 weight % to 48 % of a reactive monomer selected from the group consisting of vinyl acetate, divinyl adipate, divinyl phthalate, divinly isophthalate and mixtures thereof;
   (c) about 2 weight % of 6 weight % of a photoinitiator selected from the group of solid benzoyl cyclohexanol and liquid isopropanol; and
   (d) between about 15 weight % to 25 weight % of nitrocellulose.

2. The composition of claim 1 where the unsaturated polyester resin is the reaction product of a glycol selected from the group consisting of 1,n-alkyl diols, 1,2 alkylene glycol oligomers, and mixtures thereof and up to 80 mol. % of an unsaturated bibasic acid selected from the group consisting of maleic acid, malaic acid derivatives and fumaric acid, fumaric acid derivatives and mixtures thereof with saturated bibasic acids.

3. The composition of claim 2 where the glycol is selected from the group of tripropylene glycol, butane-1,4-diol, trimethylolethane, caprolactone triol and mixtures thereof.

4. The composition of claim 3 where the nitrocellulose is toluene wet.

5. The composition of claim 3 where the nitrocellulose is alcohol wet.

6. A process of preparing a protective coating for paper or wood involves the steps:

(1) preparing a radiation curable coating composition comprising from 4% to 35% by weight based on the total weight of the coating composition of nitrocellulose;

(2) applying the composition to a wood or paper substrate; and (3) curing the coating composition with ultraviolet (UV) radiation at ambient temperature in the presence of oxygen;

wherein the cured coating exhibits a Konig Hardness of at least 2.

7. The process of claim 6 where the substrate is paper.

8. The process of claim 6 where the substrate is wood.

9. The process of claim 6 where the nitrocellulose is tolulene wet nitrocellulose.

10. The process of claim 6 where the nitrocellulose is alcohol wet nitrocellulose.

* * * * *